United States Patent
Shirankov et al.

(10) Patent No.: US 7,777,966 B2
(45) Date of Patent: Aug. 17, 2010

(54) COMPACT ZOOM LENS

(75) Inventors: Aleksander Shirankov, Pushkino (RU); Oleg Rozhkov, Moscow (RU); Stanislav Shtykov, Moscow (RU); Aleksej Anikanov, Troitsk (RU)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 12/267,134

(22) Filed: Nov. 7, 2008

(65) Prior Publication Data

US 2009/0116119 A1 May 7, 2009

(30) Foreign Application Priority Data

Nov. 7, 2007 (RU) .............................. 2007140946
Oct. 13, 2008 (KR) ..................... 10-2008-0100196

(51) Int. Cl.
*G02B 15/14* (2006.01)
(52) U.S. Cl. ........................................ 359/683; 359/676
(58) Field of Classification Search ................. 359/676, 359/683
See application file for complete search history.

(56) References Cited

U.S. PATENT DOCUMENTS

| | | | |
|---|---|---|---|
| 5,933,281 A | 8/1999 | Suzuki | |
| 5,956,184 A * | 9/1999 | Sato | ............................ 359/683 |
| 6,025,962 A * | 2/2000 | Suzuki | ......................... 359/766 |
| 7,630,141 B2 * | 12/2009 | Saruwatari | ................... 359/686 |
| 2006/0221460 A1 | 10/2006 | Saruwatari | |
| 2007/0201146 A1 | 8/2007 | Saruwatari | |

FOREIGN PATENT DOCUMENTS

| | | |
|---|---|---|
| JP | 59-195214 A | 11/1984 |
| JP | 05-019169 A | 1/1993 |
| JP | 2001-356270 A | 12/2001 |
| JP | 2006-003913 A | 1/2006 |
| WO | 2004/066012 A1 | 8/2004 |

OTHER PUBLICATIONS

Communication from the European Patent Office issued in counterpart European Application No. 08168590.1 dated Apr. 6, 2010.

\* cited by examiner

*Primary Examiner*—William C Choi
(74) *Attorney, Agent, or Firm*—Sughrue Mion, PLLC

(57) ABSTRACT

Provided is a zoom lens. The zoom lens includes a first lens group with a positive refractive power, a second lens group with a negative refractive power, a third lens group with a positive refractive power, a fourth lens group with a negative refractive power, and a fifth lens group with a positive refractive power. The first through fifth lens groups are sequentially arranged toward an image side from an object side, and the second, fourth, and fifth lens groups move long the optical axis during zooming.

12 Claims, 13 Drawing Sheets

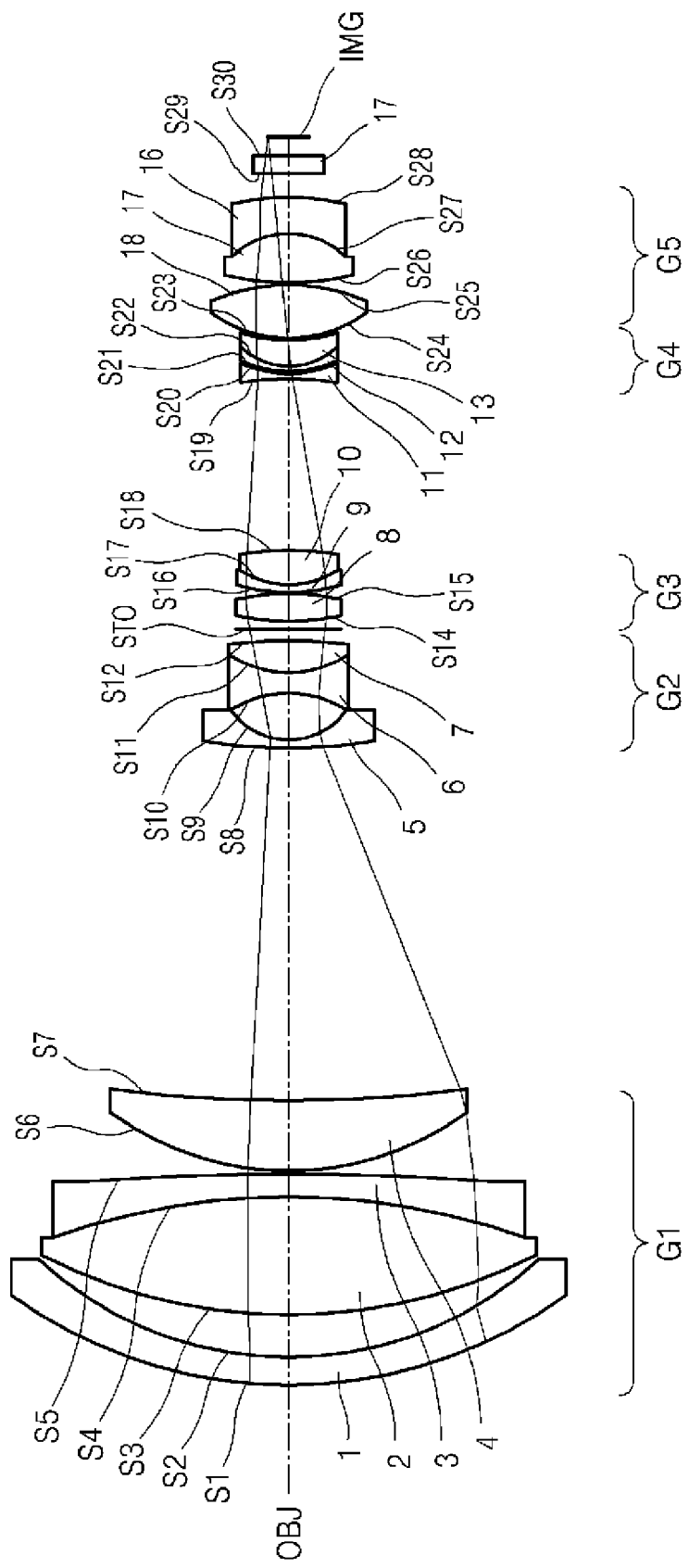

COMPACT ZOOM LENS

CROSS-REFERENCE TO RELATED PATENT APPLICATION

This application claims the benefit of Korean Patent Application No. 10-2008-0100196, filed on Oct. 13, 2008, in the Korean Intellectual Property Office, and the benefit of Russian Patent Application No.2007140946, filed on Nov. 7, 2007, the disclosures of which are incorporated herein in their entireties by reference.

BACKGROUND OF THE INVENTION

1. Field of the Invention

Apparatuses consistent with the present invention relate to a zoom lens that has various focal lengths and is applicable to photo cameras, television cameras and various optical system.

2. Description of the Related Art

In recent years, due to the increasing usage of digital cameras or video cameras using solid-state imaging devices, such as charge-coupled device (CCD) imaging devices or complementary metal-oxide semiconductor (CMOS) imaging devices, these imaging optical devices have become more and more compact, lightweight, and inexpensive. Simultaneously, users' demand for high performance, for example, a high variable magnification ratio and a good image quality, has gradually increased.

As a result, various designs for auto-zoom lenses whose focal lengths vary within wide ranges have been proposed. In order to embody various focal lengths, an auto-zoom lens includes a plurality of groups of lenses so that some groups of lenses are fixed and the remaining groups of lenses move. However, it is difficult to achieve a required image quality over the entire variation range of focal lengths. For example, a good image quality may be actually ensured at only three zoom positions. Therefore, it is needed to design a zoom lens capable of solving this problem.

SUMMARY OF THE INVENTION

The present invention provides a zoom lens having various focal lengths and a good image quality.

According to an aspect of the present invention, there is provided a zoom lens including: a first lens group with a positive refractive power; a second lens group with a negative refractive power; a third lens group with a positive refractive power; a fourth lens group with a negative refractive power; and a fifth lens group with a positive refractive power. In the zoom lens, the first through fifth lens groups are sequentially arranged toward an image side from an object side, and the second, fourth, and fifth lens groups move along an optical axis direction during zooming.

During zooming from a wide-angle end to a telephoto end, the second and fourth lens groups may move toward the image side from the object side, and the fifth lens group moves non-monotonously.

The first lens group may include two meniscus lenses, each meniscus lens having a convex surface toward the object side, and a doublet lens formed by cementing two lenses and interposed between the two meniscus lenses.

One of the meniscus lenses of the first group, which is closest to the object side, may be a negative lens formed of flint glass.

The second lens group may include a single meniscus lens with a convex surface toward the object side and a doublet lens formed by cementing two lenses.

The third lens group may include a biconvex lens and a doublet lens formed by cementing two lenses.

The fourth lens group may include a biconcave lens and a doublet lens formed by cementing two lenses.

The fifth lens group may include a biconcave lens and a doublet lens formed by cementing two lenses.

BRIEF DESCRIPTION OF THE DRAWINGS

The above and other features and aspects of the present invention will become more apparent by describing in detail exemplary embodiments thereof with reference to the attached drawings in which:

FIGS. 1A and 1B show optical arrangements of a zoom lens according to an exemplary embodiment of the present invention, which are seen from two zoom positions corresponding to both ends, respectively;

DETAILED DESCRIPTION OF THE INVENTION

Figure 1A:
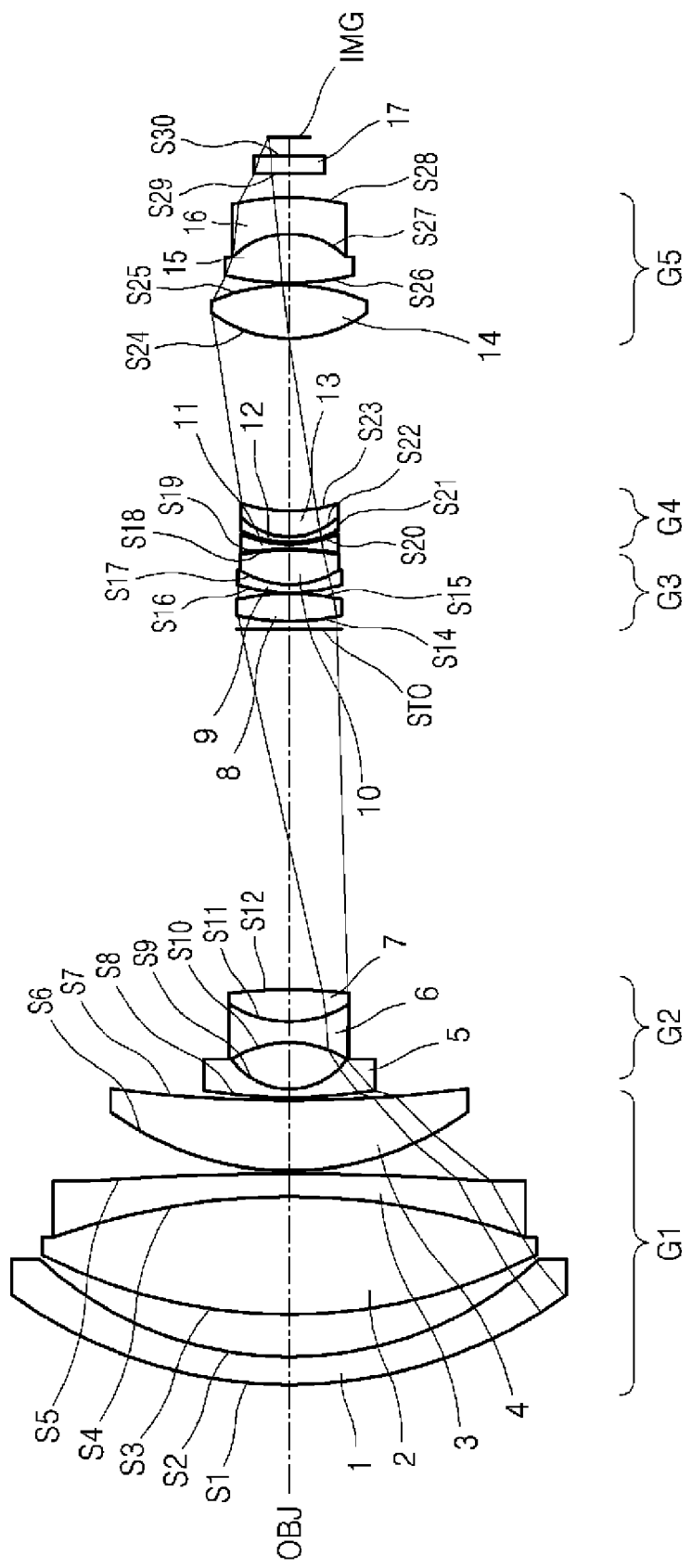
Figure 2A:
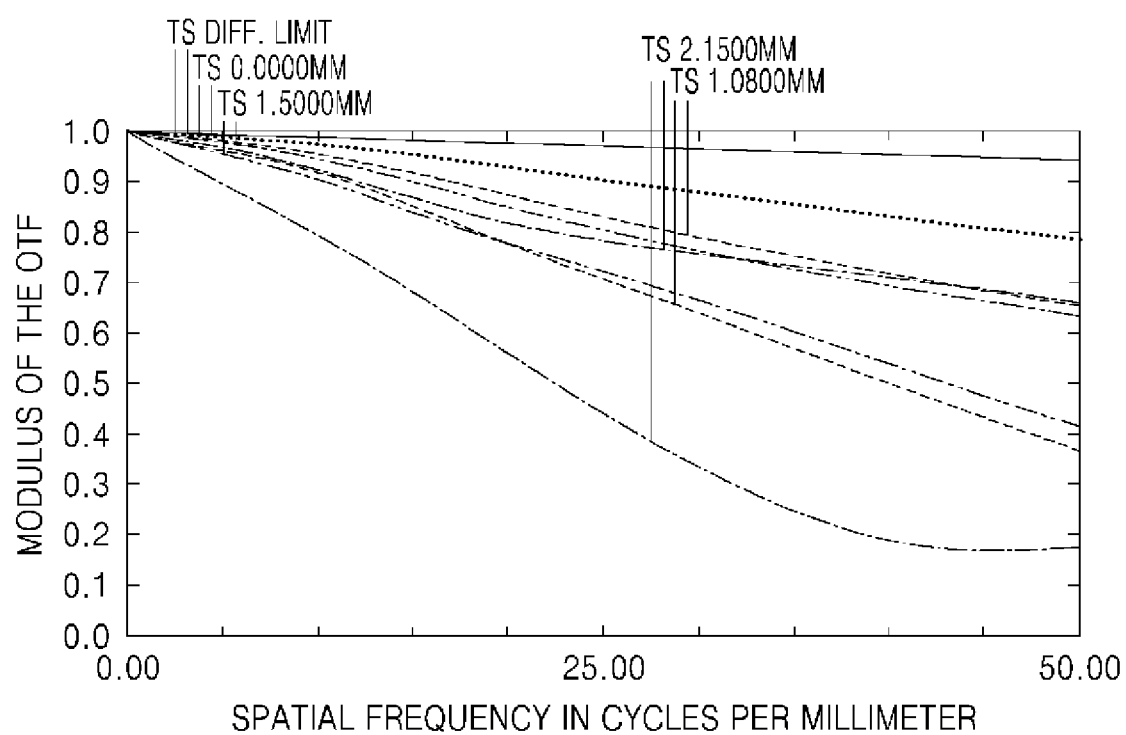
FIGS. 2A and 2B are a modulation transfer function (MTF) graph and an aberration diagram of a field curvature and distortion, respectively, at a first standard zoom position of a zoom lens according to an exemplary embodiment of the present invention.
Figure 2B:
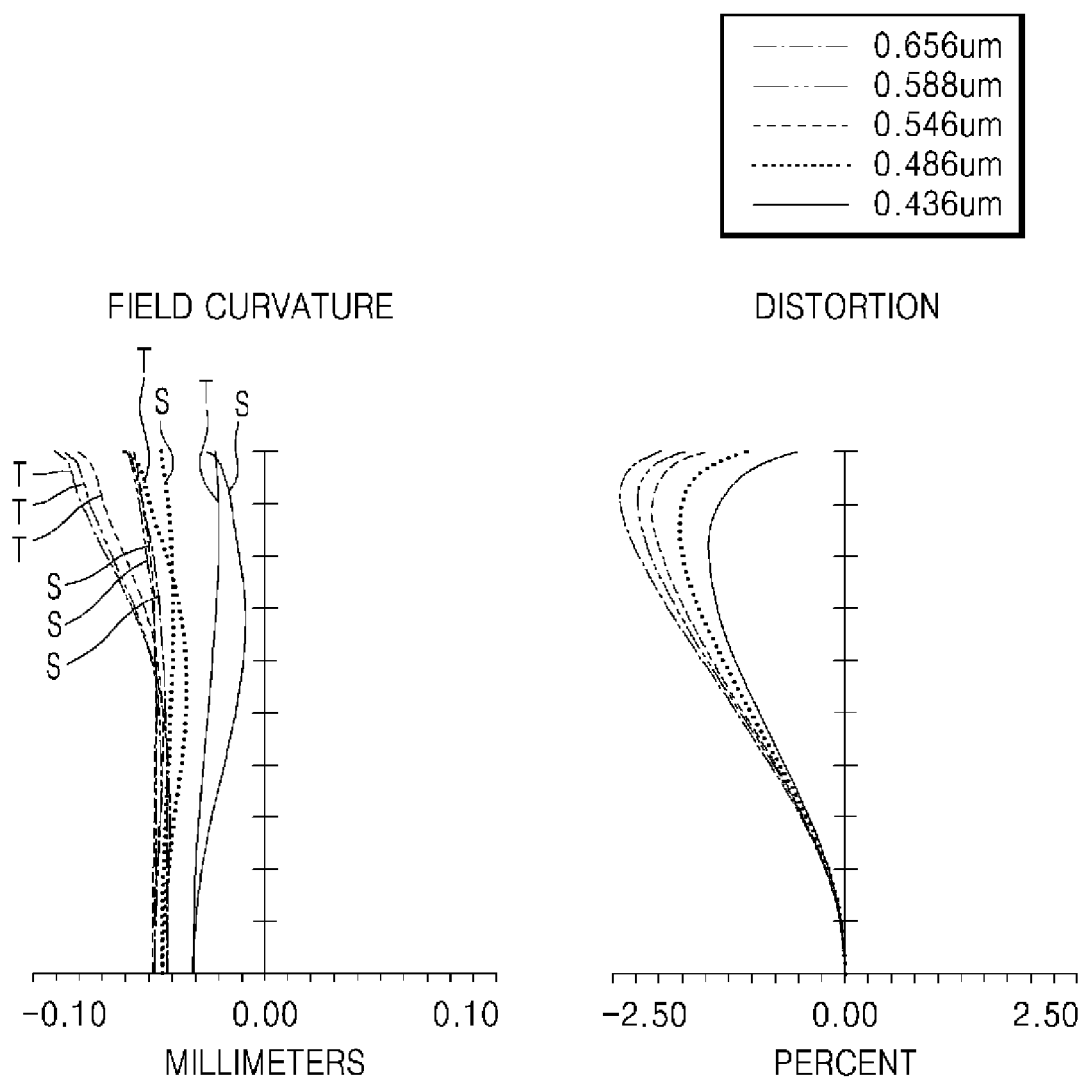
Figure 3:
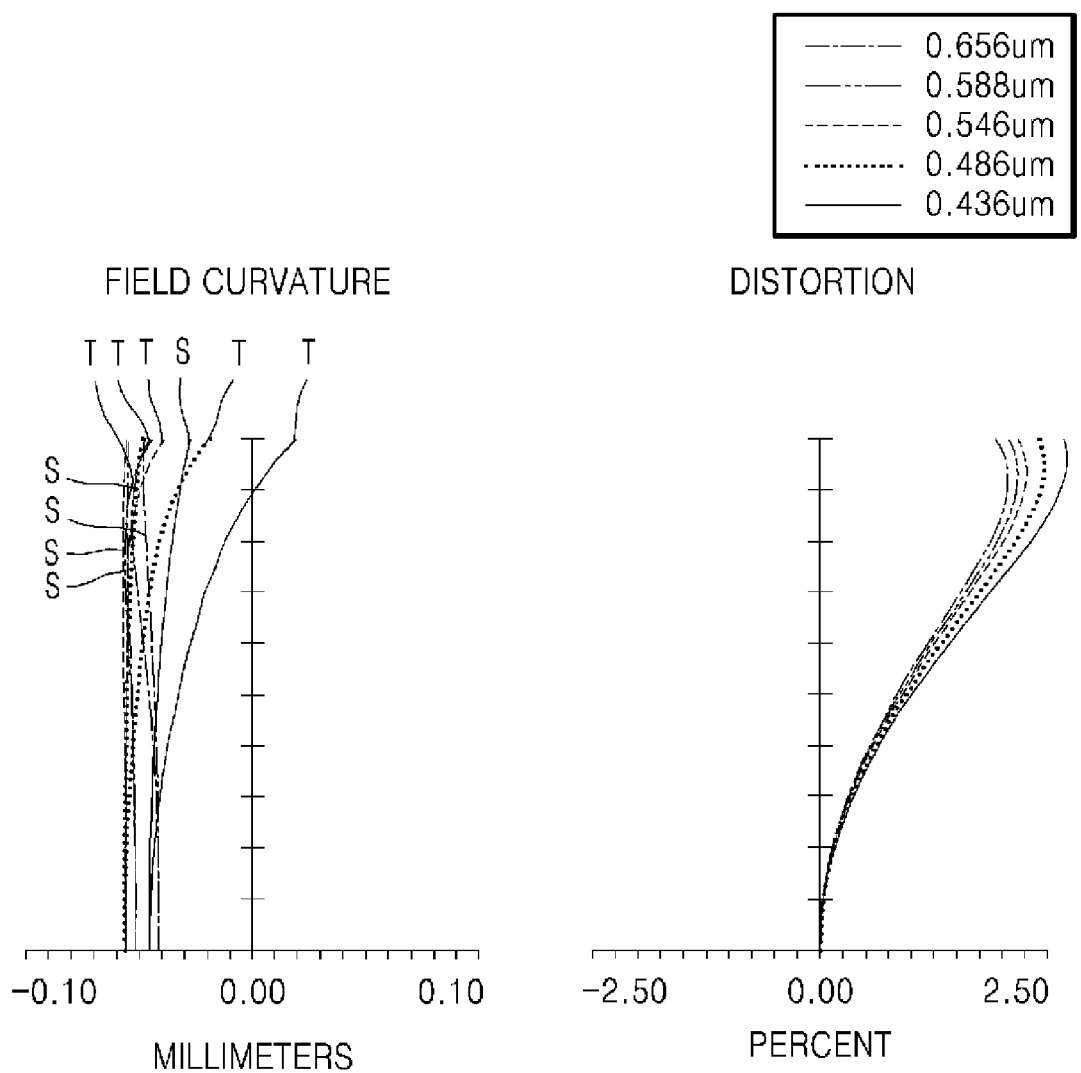
FIG. 3 is an aberration diagram of a field curvature and distortion at a second standard zoom position of the zoom lens according to the exemplary embodiment of the present invention.
Figure 4A:
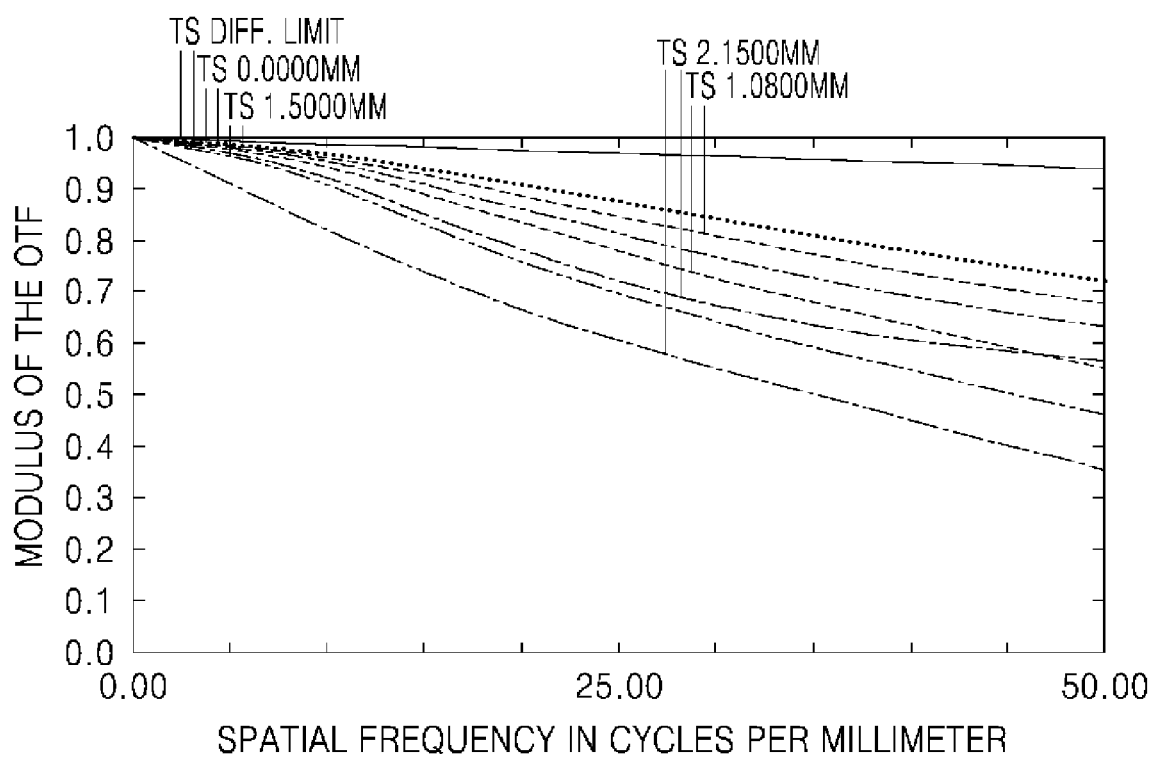
FIGS. 4A and 4B are an MTF graph and an aberration diagram of a field curvature and distortion, respectively, at a third standard zoom position of the zoom lens according to the exemplary embodiment of the present invention.
Figure 4B:
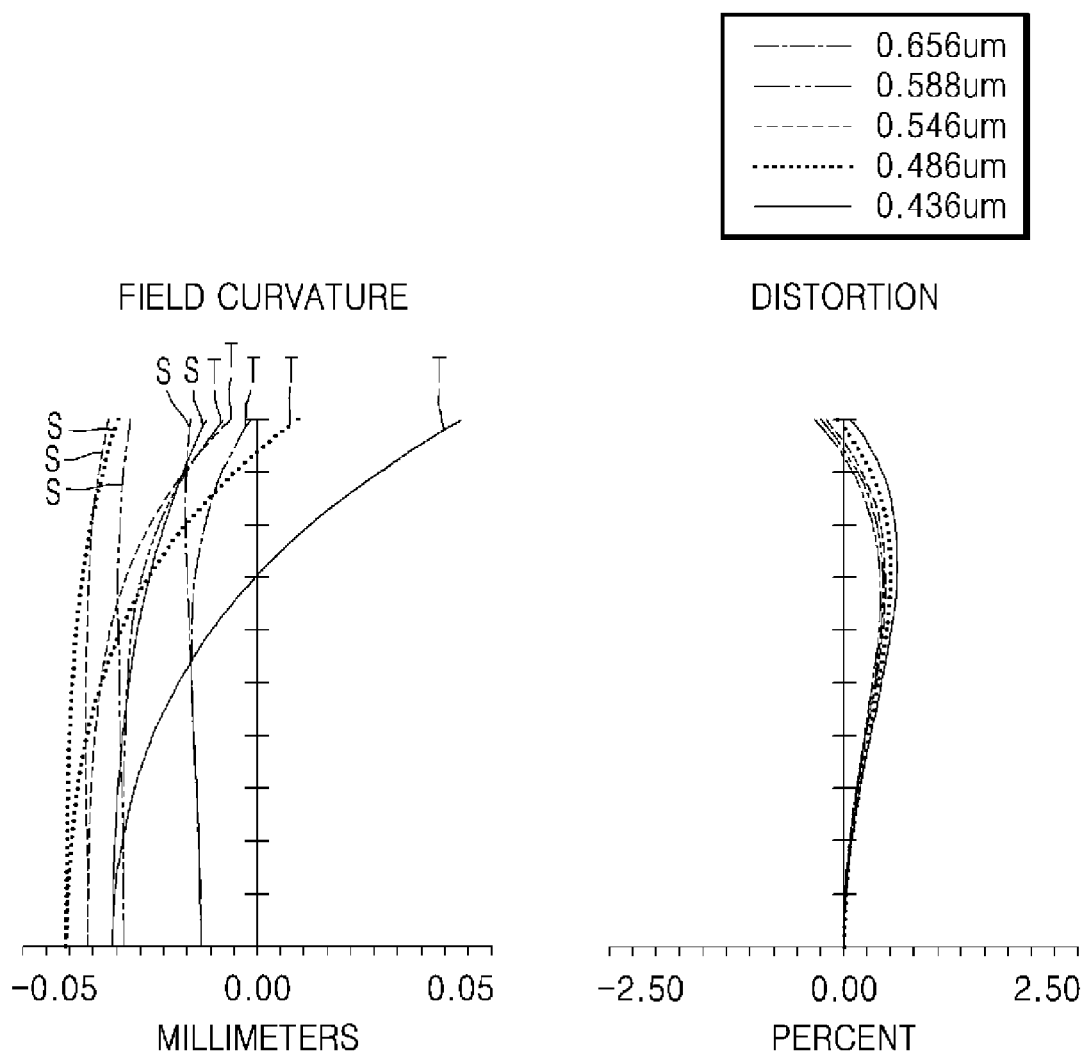
Figure 5A:
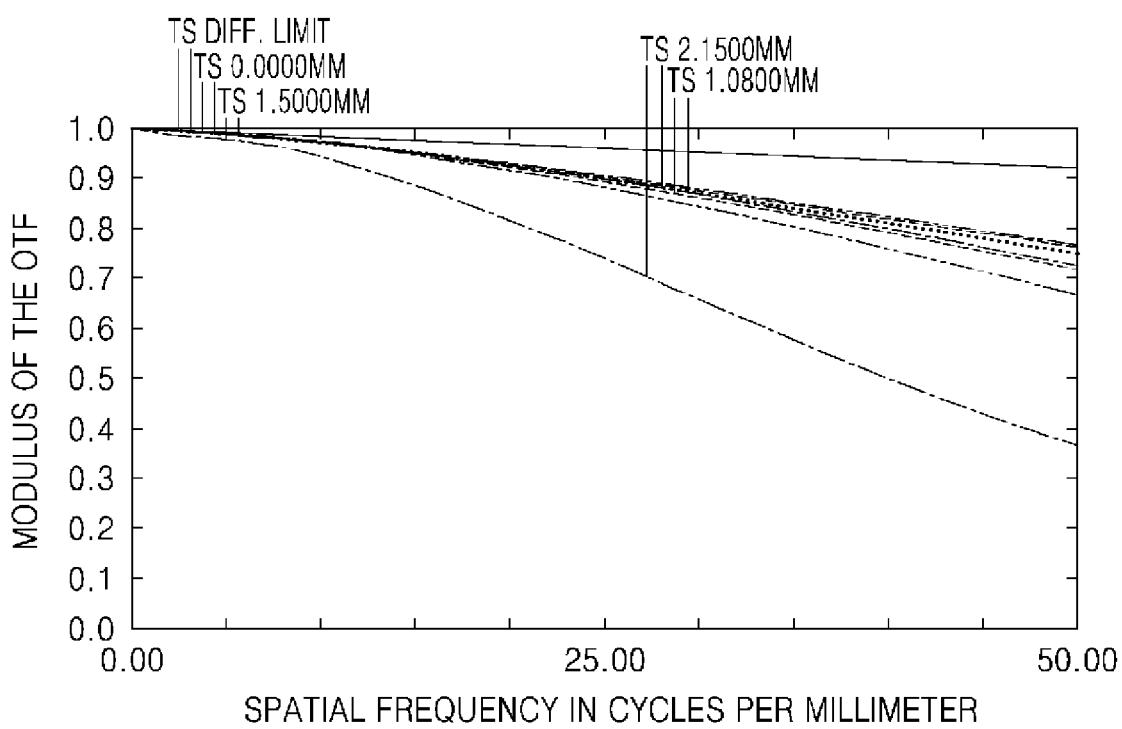
FIGS. 5A and 5B are an MTF graph and an aberration diagram of a field curvature and distortion, respectively, at a fourth standard zoom position of the zoom lens according to the exemplary embodiment of the present invention.
Figure 5B:
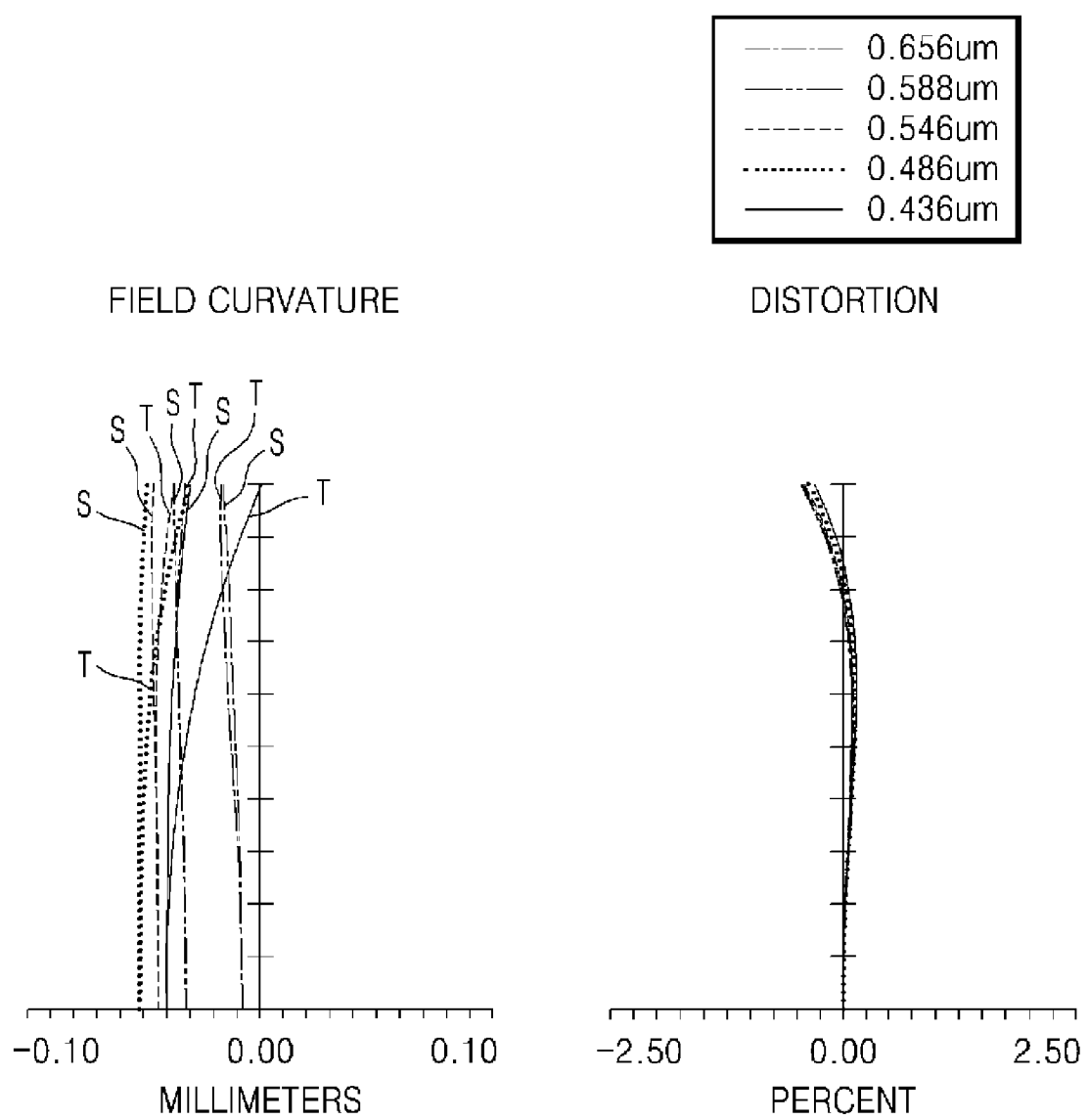
Figure 6A:
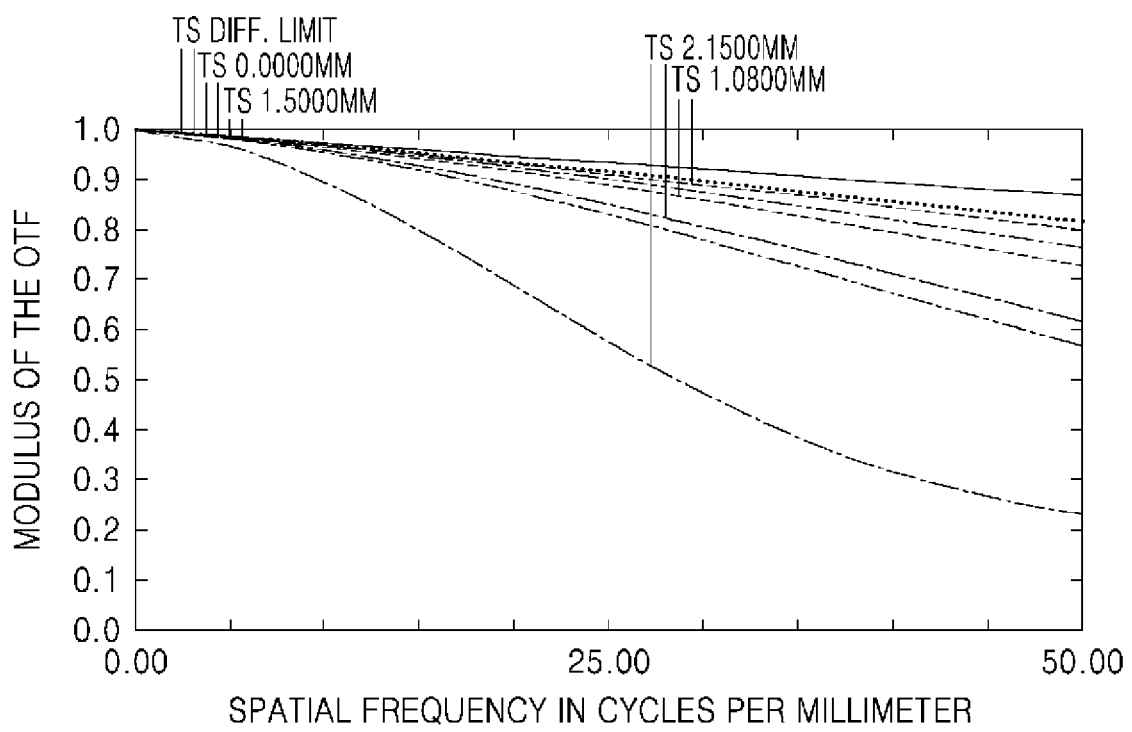
FIGS. 6A and 6B are an MTF graph and an aberration diagram of a field curvature and distortion, respectively, at a fifth standard zoom position of the zoom lens according to the exemplary embodiment of the present invention.
Figure 6B:
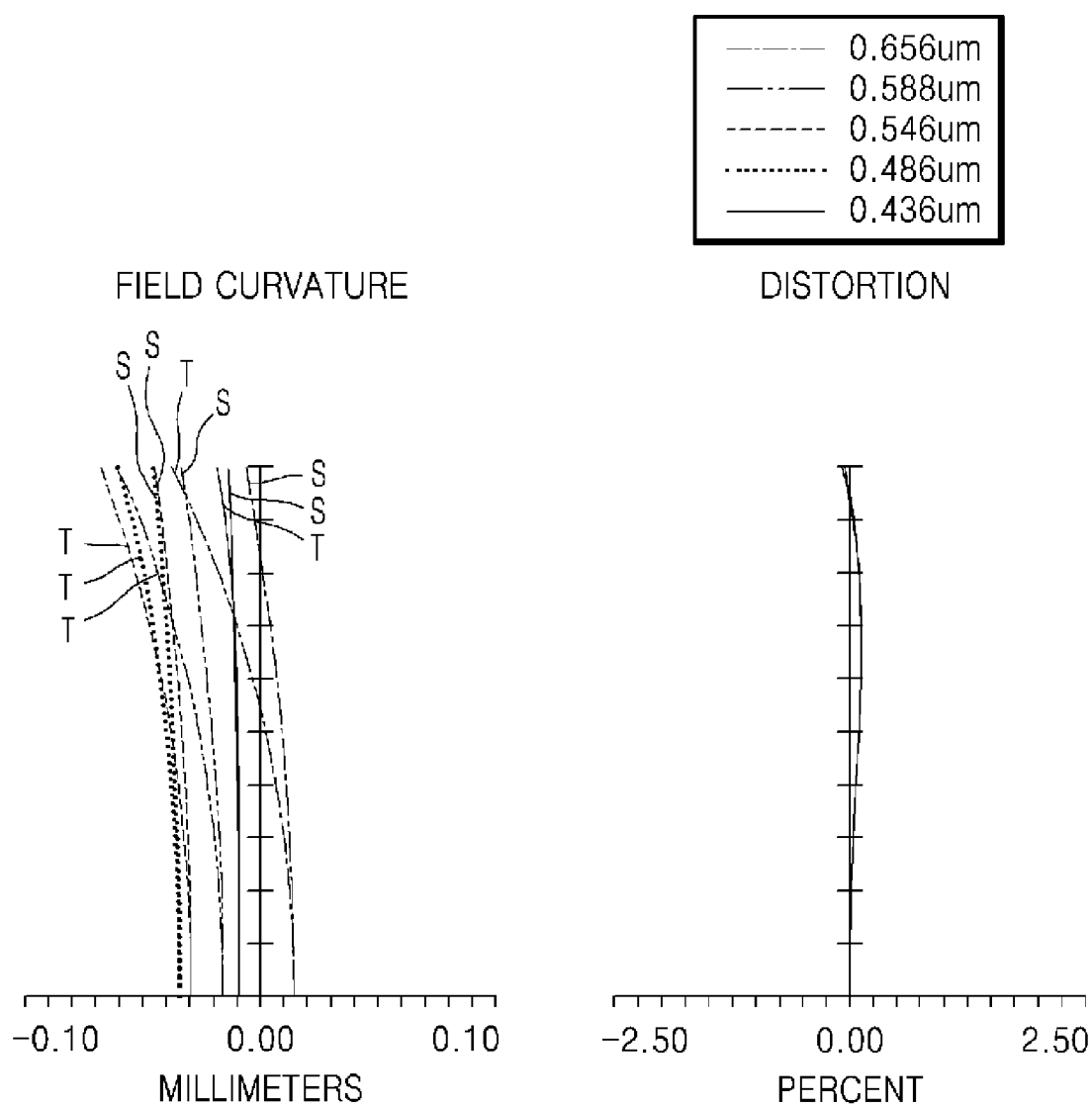
Figure 7A:
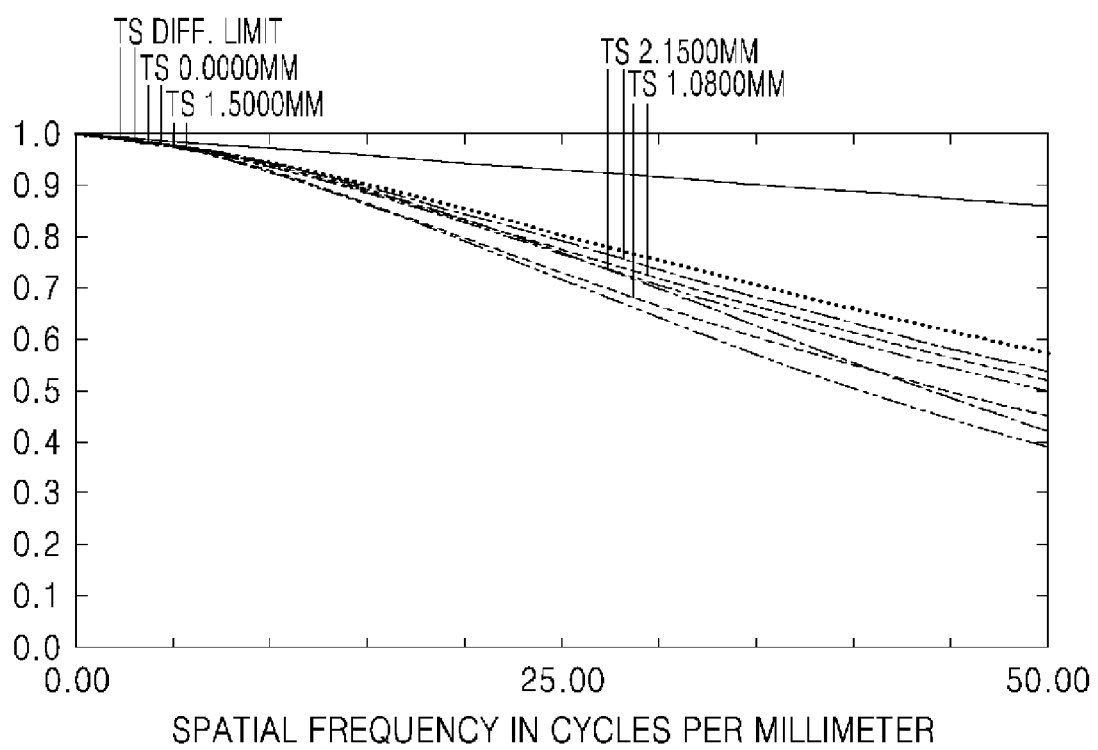
FIGS. 7A and 7B are an MTF graph and an aberration diagram of a field curvature and distortion, respectively, at a sixth standard zoom position of the zoom lens according to the exemplary embodiment of the present invention.
Figure 7B:
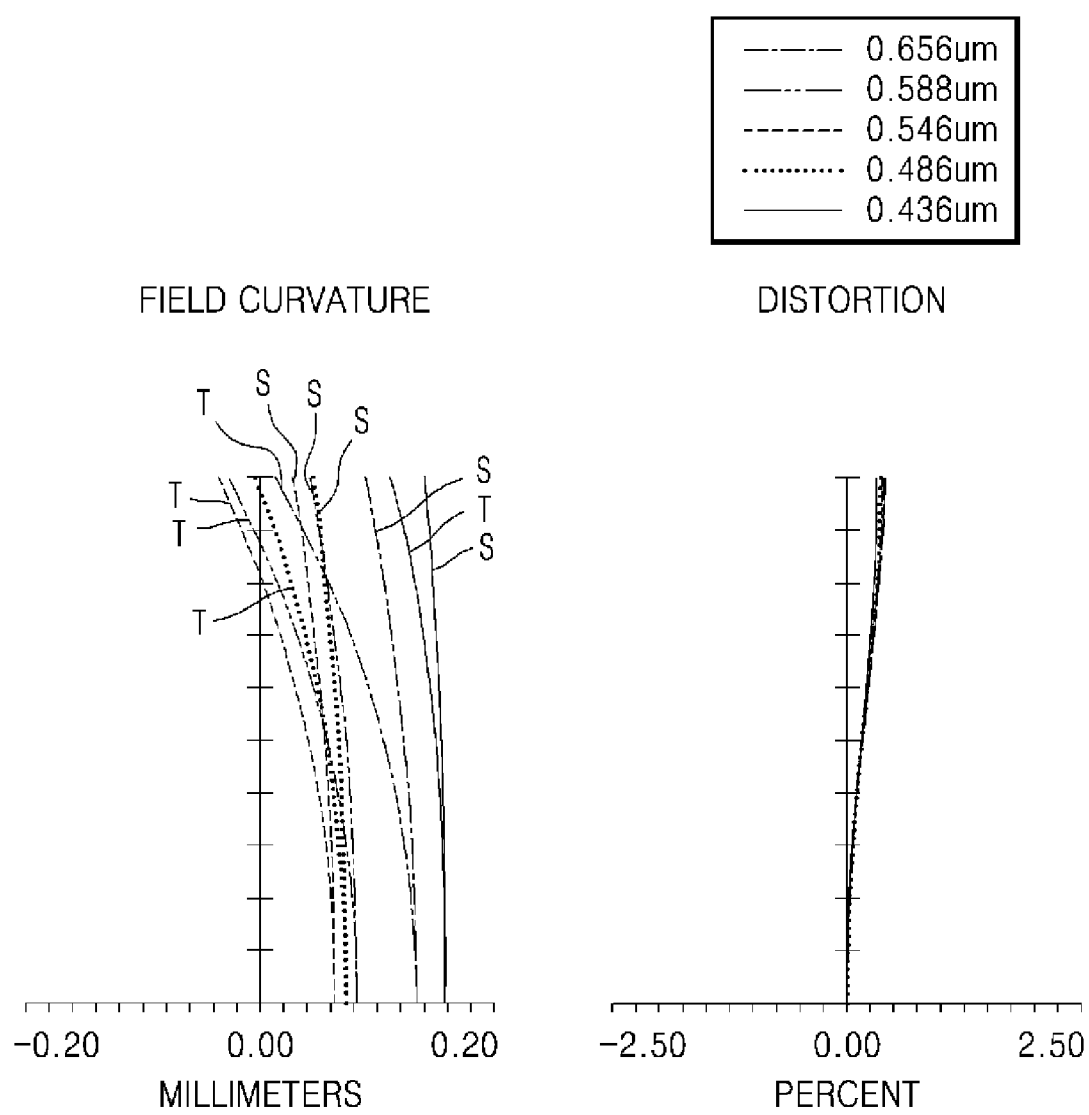

The present invention will now be described more fully hereinafter with reference to the accompanying drawings, in which exemplary embodiments of the invention are shown. In the drawings, the thicknesses of layers and regions are exaggerated for clarity. Like numbers refer to like elements throughout.

FIGS. 1A and 1B show optical arrangements of a zoom lens according to an exemplary embodiment of the present invention, which are seen from two zoom positions corresponding to both ends, respectively.

Referring to FIGS. 1A and 1B, the zoom lens according to the exemplary embodiment of the present invention may include five lens groups, for example, a first lens group GI with a positive refractive power, a second lens group G2 with a negative refractive power, a third lens group G3 with a positive refractive power G3, a fourth lens group G4 with a negative refractive power, and a fifth lens group G5 with a positive refractive power, which are sequentially arranged from an object (OBJ) side to an image (IMG) side. An iris diaphragm STO may be prepared in front of the third lens group G3. Although not shown, an imaging device, such as a charge-coupled device (CCD) imaging device or a complementary metal-oxide semiconductor (CMOS) imaging device, may be prepared on an image surface IMG. A cover glass 17 protecting the imaging device may be prepared between the fifth lens group G5 and the image surface IMG. Also, an infrared filter may be further prepared.

In the zoom lens according to the exemplary embodiment of the present invention, when zooming, the first and third lens groups G1 and G3 may be fixed, while the second and fourth lens groups G2 and G4 may move. During zooming from a wide-angle end to a telephoto end, the second lens group G2 may move toward image side from an object side, for example, monotonously and quasi-linearly. The fourth lens group G4 s may also move toward the image side from the object side during zooming from the wide-angle end to the telephoto end. The fifth lens group G5 may move along an optical axis and implement focusing according to movements of the second and fourth lens groups G2 and G4. In other words, the fifth lens group G5 may compensate for inaccuracies in the movements of the second and fourth lens groups G2 and G4 to enable more precise focusing.

Construction of the lens groups GI through G5 will now be described in more detail.

The first lens group GI may include a first lens 1, a second lens 2, a third lens 3, and a fourth lens 4. Each of the first and fourth lenses 1 and 4 may be a meniscus lens with its convex surface toward the object side. A doublet lens formed by attaching together, e.g., cementing, the second and third lenses 2 and 3 may be prepared between the first and fourth lenses 1 and 4. The first lens 1, which is a negative lens, may be formed of flint glass. The first group GI of lenses may be fixed during zooming.

The second group lens G2 may include a fifth lens 5, a sixth lens 6, and a seventh lens 7. For example, the fifth lens 5 may be a meniscus lens with its convex surface toward the object side, and the sixth and seventh lenses 6 and 7 may be attached together, e.g., cemented, to form a doublet lens. The second lens group G2 may move long the optical axis during zooming so that it can move according to the rules in order to obtain a required focal length.

The third lens group G3 may include an eighth lens 8, a ninth lens 9, and a tenth lens 10. For example, the eighth lens 8 may be a biconvex lens, and the ninth and tenth lenses 9 and 10 may be attached together, e.g., cemented, to form a doublet lens. The third lens group G3 may be fixed during zooming.

The fourth group G4 of lenses may include an eleventh lens 11, a twelfth lens 12, and a thirteenth lens 13. For example, the eleventh lens 11 may be a biconcave lens, and the twelfth and thirteenth lenses 12 and 13 may be attached together, e.g., cemented, to form a doublet lens. The fourth group G4 of lenses may move along the optical axis together with the second lens group G2 during zooming so that it can move according to the rules in order to obtain a required focal length.

The fifth group lens G5 may include a fourteenth lens 14, a fifth lens 15, and a sixth lens 16. For example, the fourteenth lens 14 may be a biconvex lens, and the fifth and sixth lenses 15 and 16 may be attached together, e.g., cemented, to form a doublet lens. The fifth lens group G5 may be prepared to ensure an image quality when various focal lengths are embodied due to zooming. In other words, the fifth lens group G5 may compensate for inaccuracies in the movements of the second lens group G2 or the fourth lens group G4 so as to enable more precise focusing.

During zooming, the fifth lens group G5 may move within a smaller range than the second lens group G2 or the fourth lens group G4. For example, the fifth lens group G5 may move nonlinearly and non-monotonously, i.e., in a back and forth motion, along the optical axis, during zooming.

Lens data of the zoom lens according to the exemplary embodiment of the present invention are as follows. The lens data include the radii of curvature, thicknesses, materials, and diameters of lenses. Variable distances between lenses during zooming may be expressed by D1 through D5, and a sign * following a surface number denotes an aspherical lens.

| Surface/Radius of curvature/Thickness/Material/Diameter/ Conic constant | | | | | |
|---|---|---|---|---|---|
| OBJ | Infinity | Infinity | | | |
| 1 | 57.52859 | 1.653052 | SF57 | 58.61237 | 0 |
| 2 | 43.51602 | 1.580064 | | 54.08977 | 0 |
| 3 | 49.73049 | 19.37032 | FCD10 | 53.9433 | 0 |
| 4 | −44.59086 | 3.024693 | BK7 | 47.87725 | 0 |
| 5 | −193.5404 | 0.1423909 | | 37.60098 | 0 |
| 6 | 32.39125 | 6.63269 | FK5 | 26.51158 | 0 |
| 7 | 123.038 | D1 | | 18.42883 | 0 |
| 8 | 490.7384 | 0.6772056 | S-LAH58 | 17.82152 | 0 |
| 9* | 7.109735 | 4.404882 | | 12.93184 | −0.5833861 |
| 10 | −19.97442 | 3.492044 | N-LAF34 | 12.90678 | 0 |
| 11 | 9.252809 | 4.484457 | SF57 | 12.92831 | 0 |
| 12 | 107.2223 | D2 | | 12.77297 | 0 |
| STO | Infinity | 0.2 | | 11.32573 | 0 |
| 14* | 24.87885 | 3.344874 | N-SK5 | 11.71668 | −2.455584 |
| 15 | −26.41103 | 0.1514151 | | 11.96365 | 0 |
| 16 | 18.42726 | 0.7331302 | SF57 | 11.82418 | 0 |
| 17 | 9.919783 | 4.663668 | N-SK5 | 11.29697 | 0 |
| 18 | −36.27423 | D3 | | 10.81353 | 0 |
| 19 | −28.51005 | 0.6716656 | N-LASF44 | 10.77818 | 0 |
| 20 | 11.31392 | 0.2705404 | | 10.54105 | 0 |
| 21 | 10.69522 | 0.9175533 | SF2 | 10.913 | 0 |
| 22 | 7.096664 | 2.805791 | SF57 | 10.79377 | 0 |
| 23 | 12.02057 | D4 | | 10.36933 | 0 |
| 24 | 15.82589 | 4.680485 | FK5 | 15.6301 | −1.086487 |
| 25 | −21.60283 | 0.7964118 | | 15.44503 | 0 |
| 26 | 14.24238 | 4.897596 | N-SK5 | 13.00893 | 0 |
| 27 | −8.344696 | 1.52174 | SF57 | 12.70265 | 0 |
| 28* | −42.00647 | D5 | | 12.02195 | 25.1624 |
| 29 | Infinity | 2 | BK7 | 7.706201 | 0 |
| 30 | Infinity | 2 | | 6.319276 | 0 |
| IMG | Infinity | | | 4.550047 | 0 |

The zoom lens according to the exemplary embodiment of the present invention has 39× magnifications, a view angle 2ω of about 80 to 2°, and an f number of about 1.6 to 3.9. Focal lengths f, variable distances D1 to D5 between lenses, and apertures at six standard zoom positions are as follows.

First standard zoom position (f=2.63 mm)
D1: 0.334677
D2: 38.86532
D3: 0.1787433
D4: 18.24062
D5: 3.130411
Aperture: 1.64
Second standard zoom position (f=5.12 mm)
D1: 11.578
D2: 27.622
D3: 2.119287
D4: 16.89185
D5: 2.538272
Aperture: 2.95
Third standard zoom position (f=10.26 mm)
D1: 21.58687
D2: 17.61313
D3: 4.433143

D4: 14.19202
D5: 2.924905
Aperture: 6.6
Fourth standard zoom position (f=22.0 mm)
D1: 28.78316
D2: 10.41684
D3: 8.375212
D4: 10.37058
D5: 2.803959
Aperture: 10
Fifth standard zoom position (f=44.5 mm)
D1: 34.1428
D2: 5.057203
D3: 12.31351
D4: 4.827702
D5: 4.408089
Aperture: 13
Sixth standard zoom position (f=102.5 mm)
D1: 38.28184
D2: 0.9181604
D3: 18.60366
D4: 0.4797248
D5: 2.466178
Aperture: 25.63

FIGS. 2A, 4A, 5A, 6A, and 7A are modulation transfer function (MTF) graphs obtained at first, third, fourth, fifth, and sixth standard zoom positions of a zoom lens according to an exemplary embodiment of the present invention, and FIGS. 2B, 3, 4B, 5B, 6B, and 7B are aberration diagrams of a field curvature and distortion obtained at first through sixth standard zoom positions of the zoom lens according to the exemplary embodiment of the present invention. In the drawings, reference characters "T" and "S" refer to "meridional" and "sagittal", respectively, and the wavelength range of used light beams ranged from 0.436 um to 0.656 um.

The zoom lens according to an exemplary embodiment of the present invention includes the fifth lens group G5 in order to enable precise focusing. This can significantly reduce the burden of controlling the movements of the second and fourth groups G2 and G4 of lenses with a very high degree of precision during zooming.

The zoom lens according to the exemplary embodiment of the present invention includes the above-described construction so that it can have excellent optical performance at six standard zoom positions.

While the present invention has been particularly shown and described with reference to exemplary embodiments thereof, it will be understood by one of ordinary skill in the art that various variations in form and details may be made therein without departing from the spirit and scope of the present invention as defined by the following claims.

What is claimed is:

1. A zoom lens comprising:
a first lens group with a positive refractive power;
a second lens group with a negative refractive power;
a third lens group with a positive refractive power;
a fourth lens group with a negative refractive power; and
a fifth lens group with a positive refractive power,
wherein the first through the fifth lens groups are sequentially arranged from an object side toward an image side,
wherein the second, the fourth, and the fifth lens groups move along an optical axis during zooming, and
wherein the fifth lens group moves in a back and forth motion along the optical axis during zooming from a wide-angle end to a telephoto end, and wherein the first lens group comprises two meniscus lenses, each of the two meniscus lens having a convex surface toward the object side, and a doublet lens formed by attaching together two lenses and interposed between the two meniscus lenses.

2. The zoom lens of claim 1, wherein the second and the fourth lens groups move toward the image side from the object side during zooming from a wide-angle end to a telephoto end.

3. The zoom lens of claim 1, wherein one of the two meniscus lenses of the first group, which is closest to the object side, is a negative lens formed of flint glass.

4. The zoom lens of claim 1, wherein the second lens group comprises a single meniscus lens with a convex surface disposed toward the object side and a doublet lens formed by attaching together two lenses.

5. The zoom lens of claim 1, wherein the third lens group comprises a biconvex lens and a doublet lens formed by attaching together two lenses.

6. The zoom lens of claim 1, wherein the fifth lens group comprises a biconvex lens and a doublet lens formed by attaching together two lenses.

7. The zoom lens of claim 1, wherein the doublet lens is formed by cementing the two lenses together.

8. The zoom lens of claim 1, wherein the first and the third lens groups are fixed during zooming.

9. A zoom lens comprising:
a first lens group with a positive refractive power;
a second lens group with a negative refractive power;
a third lens group with a positive refractive power;
a fourth lens group with a negative refractive power; and
a fifth lens group with a positive refractive power,
wherein the first through the fifth lens groups are sequentially arranged from an object side toward an image side,
wherein the second, the fourth, and the fifth lens groups move along an optical axis during zooming, and
wherein the fifth lens group moves in a back and forth motion along the optical axis during zooming from a wide-angle end to a telephoto end, and
wherein the fourth lens group comprises a biconcave lens and a doublet lens formed by attaching together two lenses.

10. A zoom lens comprising:
a first lens group with a positive refractive power;
a second lens group with a negative refractive power;
a third lens group with a positive refractive power;
a fourth lens group with a negative refractive power; and
a fifth lens group with a positive refractive power,
wherein the first through the fifth lens groups are sequentially arranged from an object side toward an image side,
wherein the second, the fourth, and the fifth lens groups move along an optical axis during zooming, and
wherein the first lens group comprises two meniscus lenses, each of the two meniscus lens having a convex surface toward the object side, and a doublet lens formed by attaching together two lenses and interposed between the two meniscus lenses.

11. The zoom lens of claim 10, wherein one of the two meniscus lenses of the first group, which is closest to the object side, is a negative lens formed of flint glass.

12. The zoom lens of claim 10, wherein the doublet lens is formed by cementing the two lenses together.

* * * * *